US 8,131,902 B2

(12) United States Patent
Karstens

(10) Patent No.: US 8,131,902 B2
(45) Date of Patent: Mar. 6, 2012

(54) DETERMINING ORIENTATION OF BLADE SERVER INSERTED INTO A BLADE CHASSIS

(75) Inventor: Christopher Kent Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 11/682,721

(22) Filed: Mar. 6, 2007

(65) Prior Publication Data

US 2008/0222310 A1 Sep. 11, 2008

(51) Int. Cl.
H05K 7/10 (2006.01)
G09G 5/02 (2006.01)

(52) U.S. Cl. ............ 710/301; 710/2; 710/10; 710/104; 345/649; 361/600; 361/679.01; 361/679.02; 361/724; 361/725; 361/727; 361/752; 361/785

(58) Field of Classification Search .................. None
See application file for complete search history.

(56) References Cited

U.S. PATENT DOCUMENTS

| | | | | |
|---|---|---|---|---|
| 5,764,968 A * | 6/1998 | Ninomiya | .................... | 713/601 |
| 6,145,037 A * | 11/2000 | Sakakibara | .................... | 710/301 |
| 6,183,307 B1 * | 2/2001 | Laity et al. | .................... | 439/676 |
| 6,351,375 B1 * | 2/2002 | Hsieh et al. | .............. | 361/679.33 |
| 6,452,809 B1 | 9/2002 | Jackson et al. | ................ | 361/796 |
| 6,668,294 B1 * | 12/2003 | Benson et al. | ................ | 710/104 |
| 6,789,151 B1 * | 9/2004 | Benson et al. | ................ | 710/305 |
| 7,043,586 B2 * | 5/2006 | Benson et al. | ................ | 710/301 |
| 7,305,494 B2 * | 12/2007 | Lee | ................ | 710/10 |
| 7,319,595 B2 * | 1/2008 | Liang et al. | ................ | 361/725 |
| 7,492,591 B1 * | 2/2009 | Aybay et al. | ................ | 361/695 |
| 7,729,116 B1 * | 6/2010 | Aybay et al. | ................ | 361/695 |
| 2002/0033836 A1 | 3/2002 | Smith | ................ | 345/649 |
| 2002/0140675 A1 | 10/2002 | Ali et al. | ................ | 345/158 |
| 2003/0090468 A1 * | 5/2003 | Finke-Anlauff | ................ | 345/169 |
| 2003/0222848 A1 | 12/2003 | Solomon et al. | ................ | 345/156 |
| 2004/0117526 A1 * | 6/2004 | Benson et al. | ................ | 710/107 |
| 2004/0120105 A1 | 6/2004 | Subbarao et al. | ........ | 361/679.25 |
| 2005/0146855 A1 * | 7/2005 | Brehm et al. | ................ | 361/724 |
| 2005/0172298 A1 * | 8/2005 | Huang et al. | ................ | 719/311 |
| 2005/0195075 A1 * | 9/2005 | McGraw et al. | ................ | 340/500 |
| 2006/0007651 A1 * | 1/2006 | Liang et al. | ................ | 361/686 |
| 2006/0061599 A1 | 3/2006 | Yu et al. | ................ | 345/649 |
| 2006/0063400 A1 | 3/2006 | Tsai | ................ | 439/74 |
| 2006/0135229 A1 | 6/2006 | Kwak et al. | ................ | 455/575.4 |
| 2006/0174687 A1 * | 8/2006 | Autor | ................ | 73/1.77 |
| 2006/0187203 A1 | 8/2006 | Piraneque et al. | ............ | 345/158 |
| 2006/0193112 A1 * | 8/2006 | Cauthron | ................ | 361/683 |
| 2007/0081308 A1 * | 4/2007 | Ishida | ................ | 361/724 |
| 2009/0237420 A1 * | 9/2009 | Lawrenz | ................ | 345/649 |

* cited by examiner

Primary Examiner — Henry Tsai
Assistant Examiner — Steven Snyder
(74) Attorney, Agent, or Firm — Yee & Associates, P.C.; Steven L. Bennett

(57) ABSTRACT

An apparatus and method is provided for determining the orientation of a blade server with respect to a blade chassis, whenever the blade is inserted into a chassis with either vertical or horizontal slots. In an embodiment, wherein the blade server has opposing first and second edges, first and second connectors are located in pre-specified corresponding relationship with the first and second blade server edges. A first device in the blade chassis generates an information signal, wherein the information signal has an element that indicates the spatial location of a reference feature of the chassis. The embodiment includes a path for sending the information signal to either the first connector or the second connector, according to the orientation of the blade inserted into the chassis. A second device identifies the connector that receives the information signals, and uses the connector identity and the signal element together to determine the orientation of the inserted blade with respect to the chassis.

14 Claims, 4 Drawing Sheets

DETERMINING ORIENTATION OF BLADE SERVER INSERTED INTO A BLADE CHASSIS

BACKGROUND OF THE INVENTION

1. Field of the Invention

The invention disclosed and claimed herein generally pertains to an apparatus and method for determining the orientation of a blade server, or other member used to support electronic components, when the blade server or other member is inserted into a blade chassis or enclosure. More particularly, the invention pertains to apparatus of the above type wherein the blade server or other member is adapted for insertion into either vertical or horizontal slots formed in the chassis, and blade orientation must be determined in order to properly orient an information display on the front panel of the blade server. Even more particularly, the invention pertains to apparatus of the above type which is comparatively simple and avoids the need for an orientation sensor or the like, while maintaining the front panel display in an upright position, for any blade orientation.

2. Description of the Related Art

As is known by those of skill in the art, blade servers, also referred to herein as blades for convenience, are self-contained computer servers designed for high density. Multiple blades can be readily inserted into an enclosure such as a chassis or the like, by means of slots formed therein, in order to provide various useful products. For example, a product of IBM known as the 8677 IBM BladeCenter® chassis has slots to receive up to 14 blade servers, and can be used in connection with small computer system interface (SCSI) storage expansion units or the like. Moreover, some blade servers provide a display on the front panel or face thereof, that is, on the blade edge that remains viewable when the blade has been inserted into a blade chassis. This display can provide a user with important information regarding operation of the blade server, and may comprise an array of light-emitting diodes (LED's), or may comprise various other graphic elements.

At present, blade server chassis typically provide slots that are oriented either vertically or horizontally, that is, oriented along either vertical or horizontal axes. In view of this, certain manufacturers have sought to provide blade servers that can be interchangeably used in chassis that have either vertical or horizontal slots. This, of course, is intended to enhance versatility in the use of blade servers. Moreover, when a blade server is inserted into a chassis, a set of connectors on the blade engage and mate with complementary connecting structure in the blade chassis, in order to exchange network and other signals, and also to supply power to the blade. Efforts have been made to configure blade servers so that they can be inserted into slots in either of two orientation modes, where the blade server is rotated by 180° between the two modes. To support this effort, the blade server is provided with two sets of connectors, where the two sets are mirrored to one another. That is, for each orientation mode of the blade when inserted into a slot, at least one of the blade connector sets will mate with the blade chassis connectors.

It will be seen that the above enhancements to blade servers, taken together, require a blade to be usable in any of four orientations, that is, two vertical and two horizontal orientations. Notwithstanding the benefit of these enhancements, it will be recognized that the display on the front panel of the blade server must be somehow adjusted, as the blade is used in different orientation modes. Otherwise, a user could be required to view information provided by the display panel in an upside down position, or at 90° to a vertical position. This could be very inconvenient, and could result in information being overlooked or misread. Moreover, as blade server front panel displays become further developed, using graphic technologies such as liquid crystal devices (LCD's) and organic LED's (OLED's), it will become increasingly important for information provided by the displays to appear upright, regardless of blade orientation, so that such information can always be easily and accurately read and comprehended.

Currently, techniques are available for constructing a front panel blade server display that can be adjustably rotated or reoriented, so that features of the display, such as alphanumeric characters or colored icons, will always appear in an upright position. However, in order to make adjustments using these techniques, it is still necessary to determine the particular orientation of the blade server, after the blade has been inserted into a chassis. In one approach for determining the orientation of an object, an electronic tilt sensor makes use of a ball bearing and several electronic contacts. This approach, however, as well as other solutions that use a sensor device of some type, tend to require space that is not practically available in the environment in which blade servers are used. Also, such solutions can entail excessive cost. Accordingly, it would be very desirable to provide a comparatively simple and inexpensive means for detecting the orientation of a blade server, upon inserting the blade into a blade chassis, that does not need a sensor mechanism nor any other significant parts or components.

BRIEF SUMMARY OF THE INVENTION

Embodiments of the invention provide an apparatus and method for determining the angular orientation of a blade server, with respect to a zero degree or other reference position, whenever the blade is inserted into either a vertical or horizontal slot of a blade chassis. This result is achieved without any need for a sensor orientation device or the like. Moreover, embodiments of the invention could be used with other types of components besides blade servers, wherein a support member is used to carry electronic components, and is insertable into a blade chassis at varying orientations therewith. One embodiment comprises apparatus for determining the orientation of a support member of the above type, wherein the support member has opposing first and second edges, and is inserted into a given chassis selected from blade chassis of different types. The apparatus comprises first and second connectors located in pre-specified corresponding relationship with the first and second edges of the support member, respectively, and further comprises a first device in the given chassis for generating an information signal, wherein the information signal has an element that indicates the spatial location of a reference feature of the chassis. The apparatus includes a path, for sending the information signal to either the first connector or the second connector, according to the orientation of the inserted support member with respect to the given chassis. A second device identifies the connector that receives the information signal, and uses the connector identity and the signal element together, in order to determine the orientation of the inserted support member with respect to the given blade chassis.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
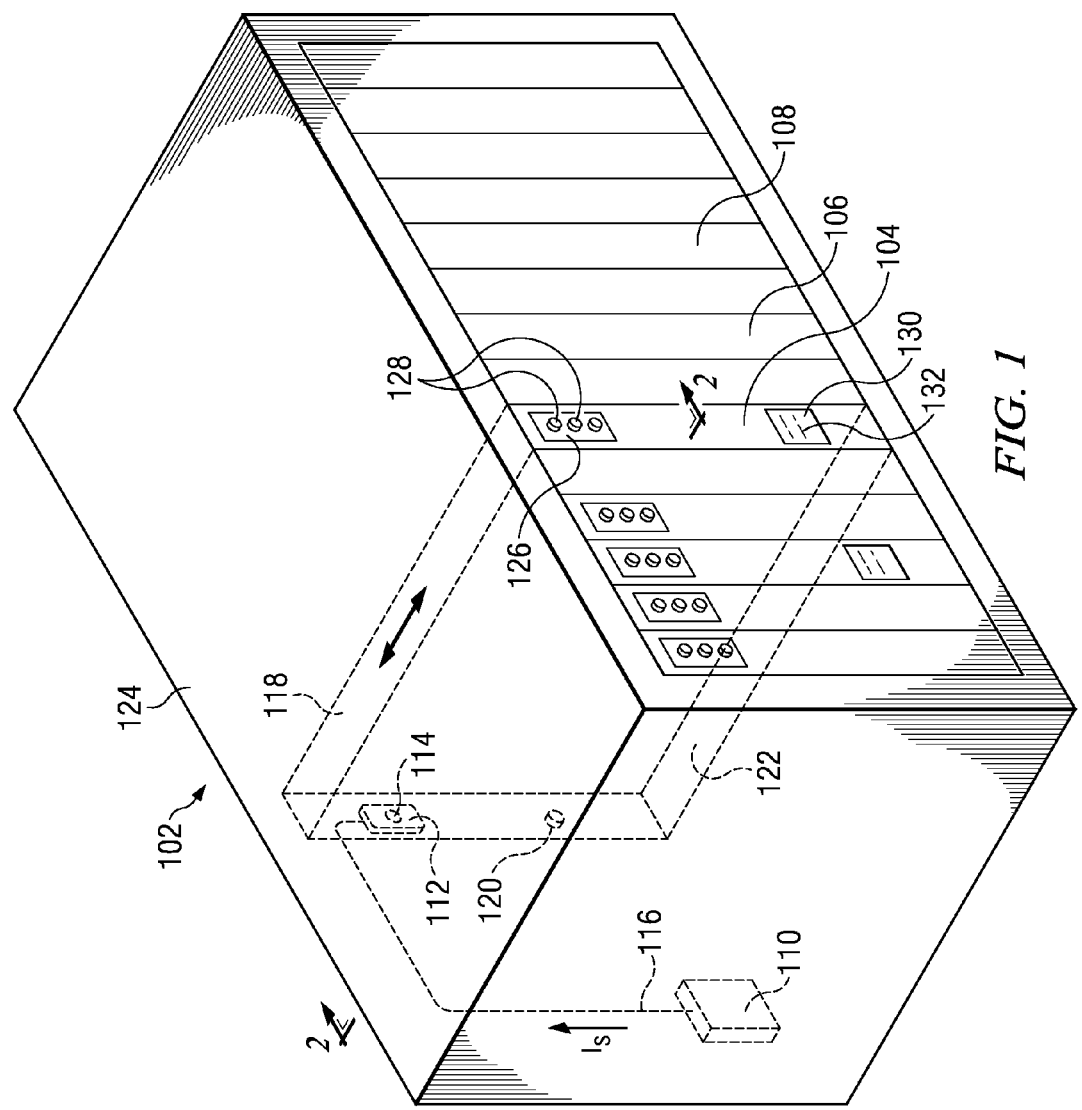
FIG. 1 is a perspective view showing blade servers inserted into a blade chassis or enclosure, wherein blade servers and the chassis are configured in accordance with an embodiment of the invention.

Referring to FIG. 1, there is shown a blade chassis 102 of a type which may be used with embodiments of the invention. Blade chassis 102 has vertical slots for receiving up to fourteen server blades by way of example, and supports a wide selection of processor technologies and operating systems, in order to allow clients to run diverse workloads inside a single architecture. FIG. 1 shows all fourteen slots of blade chassis 102 containing server blades, such as blade servers 104-108, wherein each blade server is a contained computer server designed for high density. Respective blades inserted into the chassis may selectively be different from one another, or may be similar or identical. Blade server 104, for example, may comprise an SCSI storage expansion unit. Also, server blades are designed so that they can easily be inserted into and removed from the slots of the blade chassis, as desired.

When a blade server is inserted into blade chassis 102, the chassis typically supplies power, network connections, and other interconnects to the blade, and can also provide management services. In order to perform such function, as well as to manage other tasks required in chassis operation, FIG. 1 shows blade chassis 102 furnished with a computer management module (MM) 110, comprising a small computer or data processing system. In order to connect a blade server to management module 110, a set of chassis connectors, such as connectors 112 shown in association with blade server 104, is placed at the back of each blade slot. Then, when a blade is inserted into the slot, the complementary connector or set of connectors, such as connectors 114 shown in association with blade server 104, is brought into mating engagement with connector 112. The blade server 104 is thus linked to management module 110 through connectors 112 and 114, and through a transmission path 116 extending between the connectors and module 110.

It will be appreciated that in some embodiments connectors 112 and 114 in fact comprise sets of complementary connector elements, such as corresponding pins and receptacles, and transmission path 116 comprises multiple signal carrying paths. Thus, multiple data and control signals can be exchanged between module 110 and blade 104, through connectors 112 and 114. These signals include an information signal $I_s$ that is sent to blade 104, in accordance with an embodiment of the invention as described hereinafter. Power and network signals can also be sent to blade server 104 from respective sources (not shown) through connectors 112 and 114.

Referring further to FIG. 1, there is shown blade server 104 provided with an additional connector 120, which is selectively spaced apart from connector 114. Connector 120 is substantially identical to connector 114, and is required for an embodiment of the invention, as likewise described hereinafter. FIG. 1 also shows blade server 104 having edges 118 and 122 that are in opposing relationship with one other. When blade server 104 is in the position shown in FIG. 1 with respect to blade chassis 102, edge 118 is in adjacent relationship with the topside 124 of chassis 102, and edge 122 of blade server 104 is substantially spaced apart from topside 124.

Some of the blade servers, such as blade 104, have control panels 126 on their front faces or front panels, wherein the control panels are equipped with buttons 128 for use in controlling blade server operation. Some blades also have displays 130 on their front panels, to make information 132 pertaining to blade operation available to users.

In some embodiments, each hard button will be adjacent to a display showing the function of the hard button, wherein both the button function and the corresponding display can be changed. In yet other embodiments, the buttons will be soft or virtual, that is, they will appear on a display. The functions of these soft buttons and their function labels can likewise be changed, or remapped.

Figure 2:
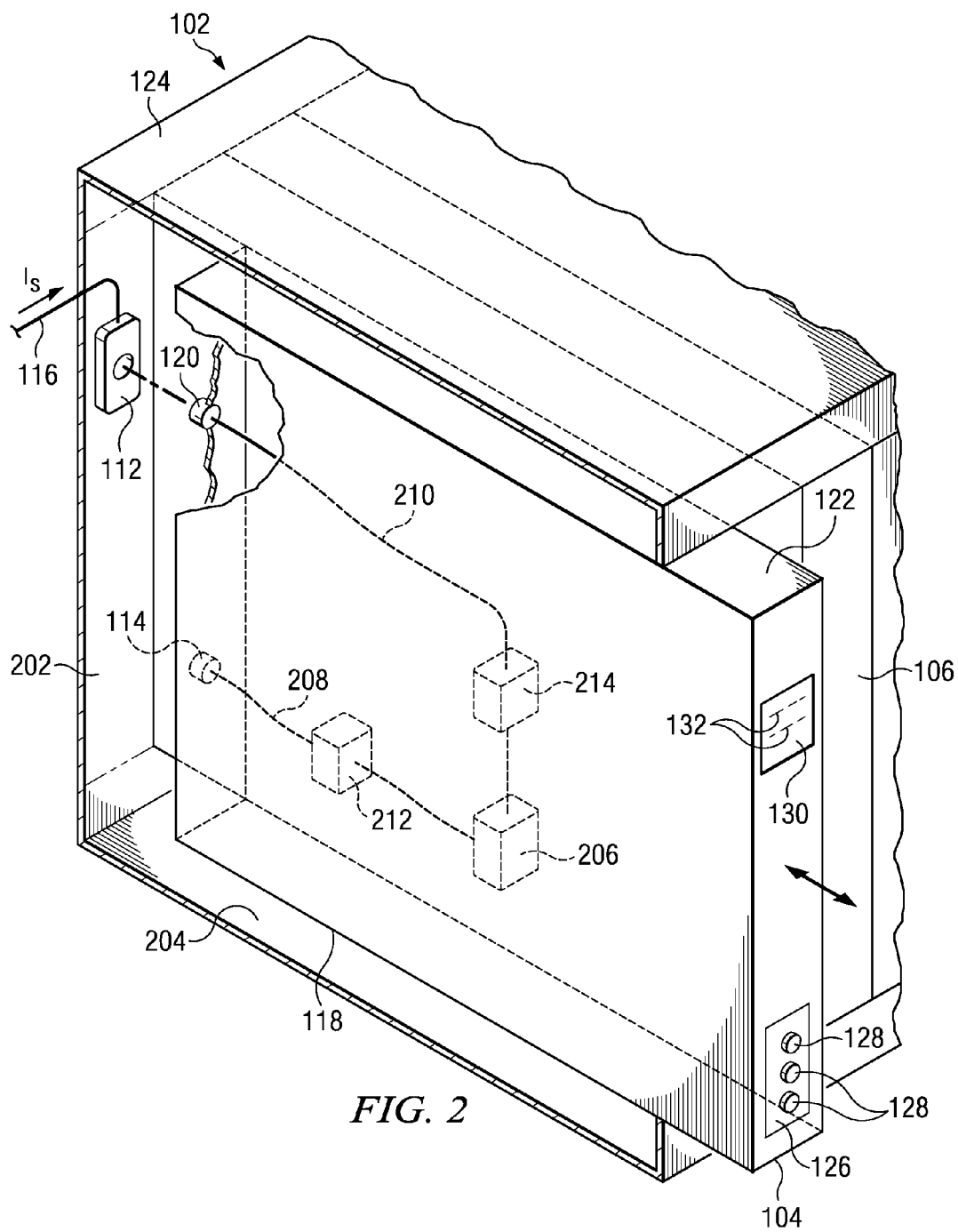
FIG. 2 is a perspective view taken along lines 2-2 of FIG. 1, wherein a portion is broken away, and one of the blade servers is shown partially extended out from the blade chassis.

Referring to FIG. 2, there is shown blade server 104 partially extending out from its slot 202 formed in blade chassis 102. In addition, blade server 104 is shown rotated by 180° with respect to slot 202 and blade chassis 102, from the position of blade server 104 shown in FIG. 1. Thus, blade edge 122 is shown adjacent to topside 124 of chassis 102, and edge 118 is spaced apart therefrom. FIG. 2 also shows edge 118 adjacent to the lower side 204 of chassis 102. Moreover, connector 120 is positioned so that when blade server 104 is inserted completely into slot 202, in the orientation shown in FIG. 2, connector 120 rather than connector 114 will be brought into engagement with connector 112 of the blade chassis. Accordingly, power will be supplied to blade server 104 through the connective interface formed by connectors 112 and 120, and signals will be exchanged therethrough between blade server 104 and the blade chassis 102.

Referring further to FIG. 2, there is shown a baseboard management controller (BMC) 206 located in blade server 104, wherein BMC 206 comprises a small computer or data processing system for controlling and managing respective operations of the blade server. BMC 206 is connected to connectors 114 and 120 by transmission links 208 and 210, respectively, in order to receive information signal $I_s$ from connector 112, and also to exchange signals with blade chassis 102.

FIG. 2 further shows that transmission links 208 and 210 include components 212 and 214, respectively. Each of these components is adapted to perform the task of selectively processing signal $I_s$, whenever information signal $I_s$ is transmitted through its corresponding link, so that the signal $I_s$ will uniquely identify the link through which it has been transmitted. For example, the component 212 or 214 could insert a code into the information signal $I_s$. By providing such identifying information, BMC 206 will be able to determine whether the information signal $I_s$ was received through link 208 or 210, and will thereby know which of the connectors 114 or 120 is then connected to chassis connector 112. In an alternative embodiment, BMC 206 would simply recognize that whichever link 208 or 210 carried the signal $I_s$ was the link connected to the top chassis connector 112.

Information signal $I_s$ is generated by management module 110 of blade chassis 102, or signal generating capable device, and generally furnishes information indicating the spatial location of a reference feature or characteristic of the blade chassis. For example, the information signal, which is received by BMC 206 through a link 208 or 210, could include the code "VT". The BMC 206 would understand from the "V" that its blade server was inserted into a vertical blade chassis slot, rather than a horizontal slot. Thus, the blade server would also have a vertical orientation. The "T" would indicate that the chassis connector 112 was being referenced to, and was thus oriented toward, the topside 124 of the blade chassis, rather than to the lower side 204 thereof. From this information, together with the identity of the connector 114 or 120 that provided the information signal, the BMC 206 will be able to readily determine which blade edge 120 or 118 is oriented upwardly, toward the blade chassis topside 124. Usefully, in this arrangement blade server 104 would have either a 0° or a 180° orientation, when connector 118 or 120, respectively, was mated to the chassis connector 112.

In some embodiments of the invention, information signal $I_s$ would be sent to the blade server from the blade chassis 102 in response to an interrogation sent from BMC 206 to the module 110. Alternatively, after the module 110 has determined that a newly inserted blade server can be used with a blade chassis, the module 110 sends a variety of environment data to the blade, including the information signal $I_s$. In yet another embodiment, the blade chassis generates a special signal through connector 112 to a blade, upon blade insertion. The BMC 206 then determines which of its connectors received the special signal.

Figure 3:
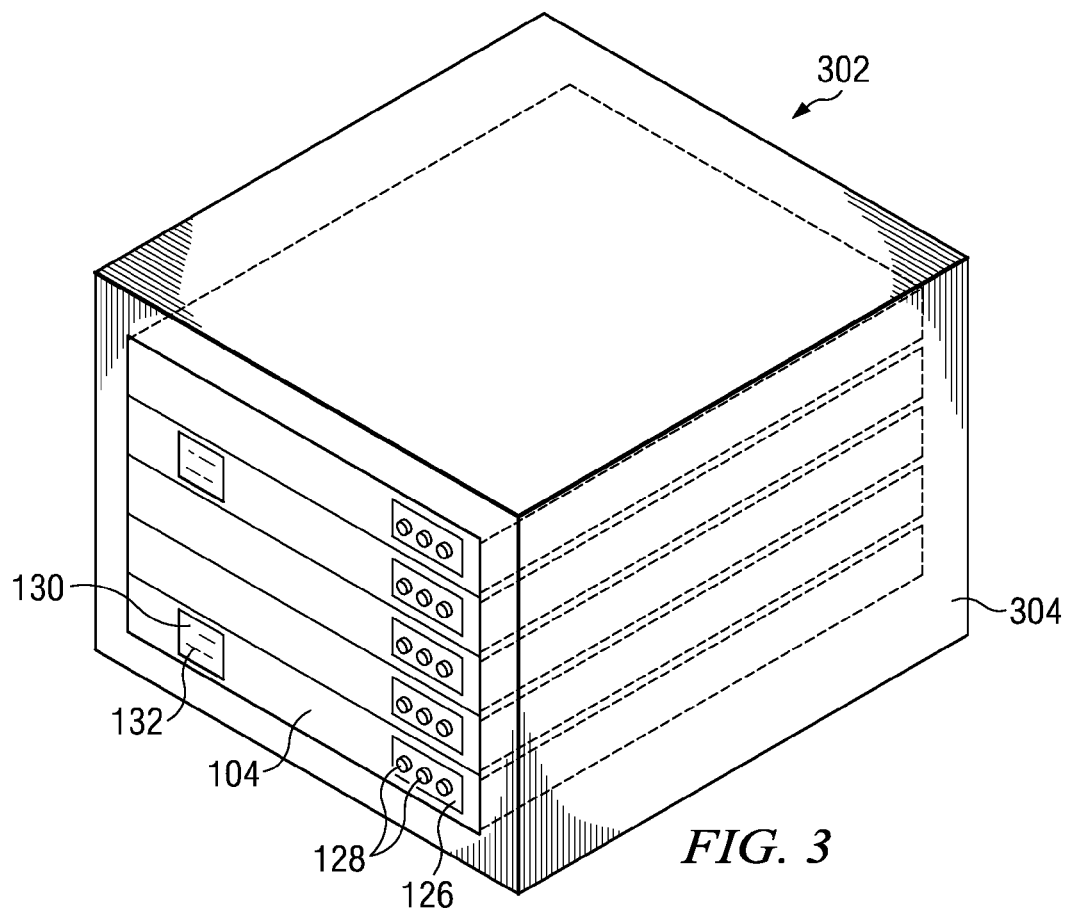
FIG. 3 is a perspective view showing a simplified blade chassis with horizontal slots for receiving blade servers.

Referring to FIG. 3, there is shown blade server 104 inserted for use into a blade chassis 302, wherein the blade chassis has horizontal slots rather than vertical slots. Blade chassis 302 is provided with a management module similar to module 110 (not shown) and a connector similar to connector 112 (not shown) as described above. However, the connector in chassis 302 is positioned close to the right hand side 304 of chassis 302, rather than to the topside thereof. In a useful embodiment, an information signal generated by blade chassis 302, and coupled to either connector 114 or 120 of blade server 104, would contain the code "HR". BMC 206 of blade 104 would interpret this code to mean that the blade was inserted into a horizontal slot, and that the edge of the blade corresponding to the connector which received the information signal was oriented to the right. Blade server 104 would thus have a 90° or 270° orientation, depending on whether the connector 118 or 120, respectively, received the information signal provided by blade chassis 302.

After determining the orientation of blade server 104, BMC 206 can rotate or reorient the information 132 appearing on display 130, as required. For example, if a liquid crystal display (LCD) or an organic LED (OLED) is used to display information, the display control can rotate the information to any angular position, with respect to a zero reference position. Thus, when orientation of the blade server has been determined as described above, information appearing on the display 130 can be rotated by BMC 206 to appear upright to a user, for any orientation.

Figure 4:
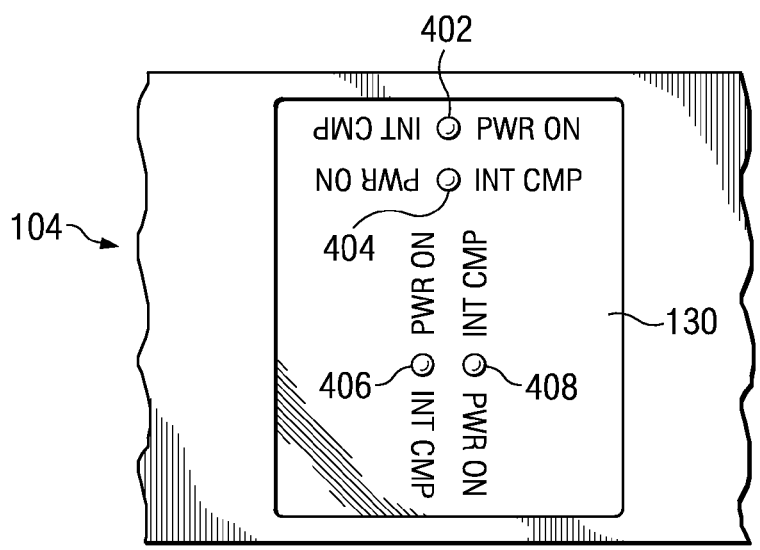
FIG. 4 is a schematic view depicting a simplified example of a display on the front panel of a blade server, to illustrate an embodiment of the invention.

Referring to FIG. 4, there is shown a display 130 for a further example of an embodiment of the invention. Display 130 includes a simplified linear array of LEDs 402 and 404, and further includes a second linear array of LEDs 406 and 408, where the second array is positioned in orthogonal relationship with the first array. When blade server 104 is inserted into a vertical slot in a 0° orientation, LED 402 is activated to indicate that power to the blade is on, and LED 404 is activated to show that initialization of the blade by the blade chassis has been completed. However, when it has been determined that blade server 104 is at a 180° orientation, BMC 206 operates LED 404 as a power on indicator, and operates LED 402 to show that initialization is completed. Similarly, after a 90° orientation of the blade has been detected, LEDs 406 and 408 are used to show that power is on and initialization is complete. Such arrangement is reversed for a blade orientation of 270°. Thus, the information and display 130 is always presented to a user in an upright mode, for each orientation of blade server 104.

Figure 5:
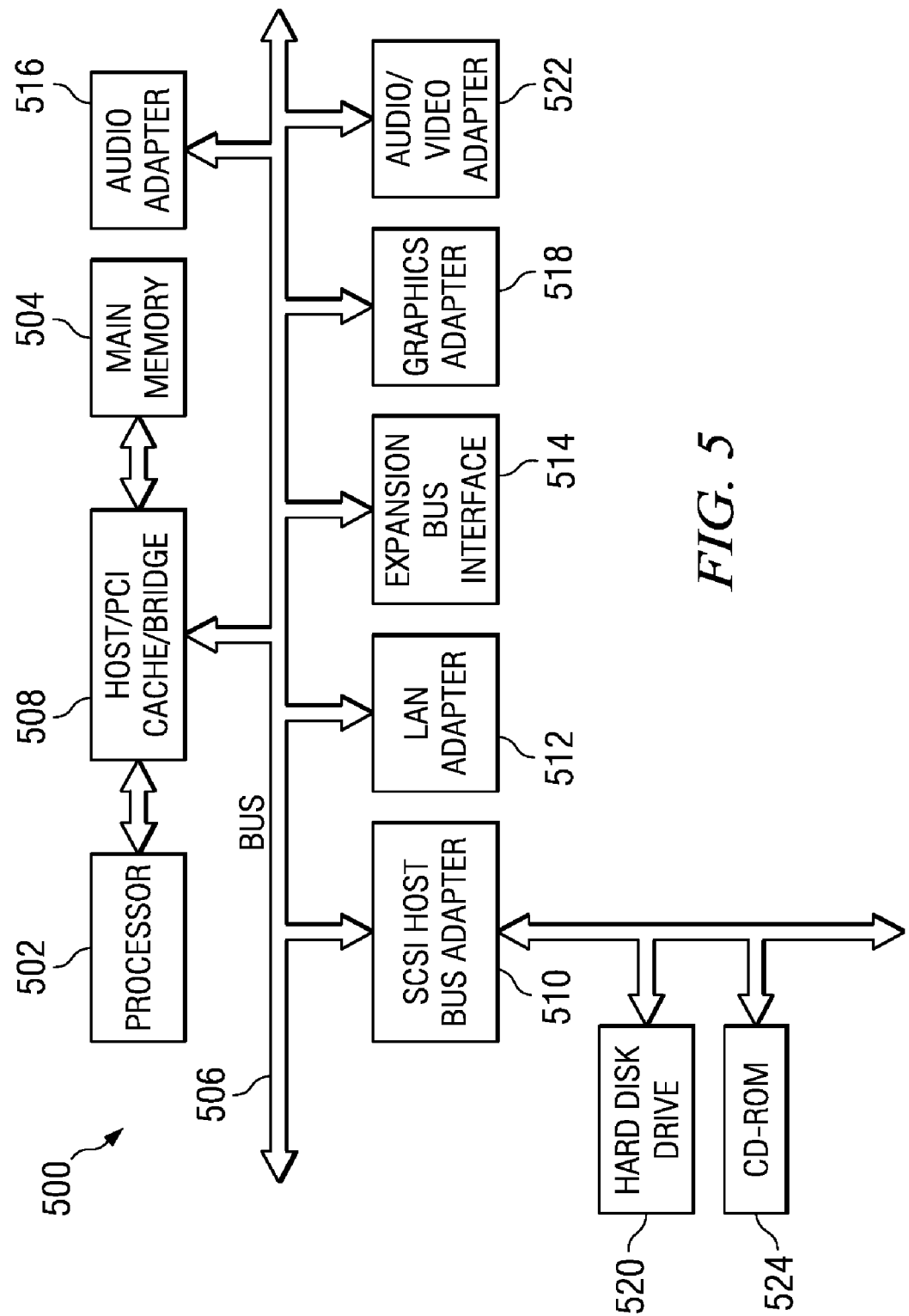
FIG. 5 is a block diagram showing a computer or data processing system that can be adapted for use as a management or control computer in both a blade server and blade chassis, in accordance with an embodiment of the invention.

Referring to FIG. 5, there is shown a block diagram of a generalized data processing system 500 which may be used in implementing embodiments of the present invention. More particularly, system 500 may be adapted for use for both management module 110 and BMC 206. Data processing system 500 exemplifies a computer, in which code or instructions for implementing the processes of the present invention may be located. Data processing system 500 usefully employs a peripheral component interconnect (PCI) local bus architecture, although other bus architectures such as Accelerated Graphics Port (AGP) and Industry Standard Architecture (ISA) may alternatively be used. FIG. 5 shows a processor 502 and main memory 504 connected to a PCI local bus 506 through a Host/PCI bridge 508. PCI bridge 508 also may include an integrated memory controller and cache memory for processor 502.

Referring further to FIG. 5, there is shown a local area network (LAN) adapter 512, a small computer system interface (SCSI) host bus adapter 510, and an expansion bus interface 514 respectively connected to PCI local bus 506 by direct component connection. Audio adapter 516, a graphics adapter 518, and audio/video adapter 522 are connected to PCI local bus 506 by means of add-in boards inserted into expansion slots. SCSI host bus adapter 510 provides a connection for hard disk drive 520, and also for CD-ROM drive 524.

An operating system runs on processor 502 and is used to coordinate and provide control of various components within data processing system 500 shown in FIG. 5. The operating system may be a commercially available operating system such as Windows XP, which is available from Microsoft Corporation. Instructions for the operating system and for applications or programs are located on storage devices, such as hard disk drive 520, and may be loaded into main memory 504 for execution by processor 502.

The invention can take the form of an entirely hardware embodiment, or an embodiment containing both hardware and software elements. In a preferred embodiment, the invention is implemented using software, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with an electronic components support member that has opposing first and second edges, and is insertable into chassis of different types for use therewith, an apparatus for determining an orientation of the support member with respect to a given one of said chassis when said support member is inserted thereinto, said apparatus comprising:
   first and second connectors located in pre-specified corresponding relationship with said first and second edges of said support member, respectively;
   a first device in said given one of said chassis for generating an information signal;
   a single connector located in said given one of said chassis that engages only said first connector when the support member is in a first orientation to exchange signals with a second device along a first link and that engages only said second connector when the support member is in a second orientation to exchange signals with said second device along a second link;
   a first component that processes the information signal to add a first link identification, wherein the first device sends said information signal from said first connector through the first component to the second device;
   a second component that processes the information signal to add a second link identification, wherein the first device sends said information signal from said second connector through the second component to the second device;
   wherein when said first connector engages said single connector, said second connector remains open and disconnected and disengaged from all other connectors; and
   wherein when said second connector engages said single connector, said first connector remains open and disconnected and disengaged from all other connectors; and
   wherein said second device determines whether the support member is in the first orientation by the first link identification and determines whether the support member is in the second orientation by the second link identification.

2. The apparatus of claim 1, wherein:
said support member is provided with a front panel adapted to present a display, wherein the display is selectively oriented with respect to a user after said orientation of said support member has been determined.

3. The apparatus of claim 1, wherein:
said information signal indicates that a slot of said given one of said chassis is either a vertically oriented slot or a horizontally oriented slot, selectively.

4. The apparatus of claim 1, wherein:
said information signal is sent from said given one of said chassis to one of said connectors through said first link or said second link in response to an interrogating signal sent to said given one of said chassis from said support member.

5. The apparatus of claim 1, wherein:
said support member comprises a blade server, and said chassis is provided with multiple vertical or horizontal slots, selectively, wherein each slot is adapted to receive a structure similar or identical to said blade server.

6. The apparatus of claim 5, wherein:
said first device is included in a management module residing in said given one of said chassis.

7. The apparatus of claim 5, wherein:
said second device is included in a control module residing in said blade server.

8. The apparatus of claim 6, wherein:
said information signal is sent from said management module along said first link to said first connector or along said second link to said second connector, together with other information, as part of an initialization procedure that is carried out when said blade server is inserted into one of said slots.

9. The apparatus of claim 2, wherein:
said display has a pre-specified upright mode, and is oriented to said upright mode regardless of the orientation of said support member with respect to said given one of said chassis.

10. An apparatus for determining a blade server orientation comprising:
   a blade server having first and second edges, and also having first and second connectors mounted therein, wherein said first and second connectors are located in pre-specified corresponding relationship with said first and second edges, respectively;
   a blade chassis having a slot and a chassis connector, said blade server being insertable into said slot to cause said chassis connector to engage with only said first connector or only said second connector depending on a blade server orientation of said inserted blade server with respect to said blade chassis;
   a first device in said blade chassis for generating an information signal;
   a single connector located in said blade chassis that engages said first connector when the blade server is in a first orientation to exchange signals with a second device along a first link and that engages said second connector when the blade server is in a second orientation to exchange signals with said second device along a second link;
   wherein when said first connector is engaged with said chassis connector, said second connector remaining open and disconnected and disengaged from all other connectors; and
   wherein when said second connector is engaged with said chassis connector, said first connector remaining open and disconnected and disengaged from all other connectors;
   wherein the second device determines whether the blade server is in the first orientation by a first link identification or determines determining, by the second device whether the blade server is in the second orientation by a second link identification;
   wherein selected components are provided in association with said first and second connectors, for use in enabling said second device to identify said connector receiving said information signal;
   a first component that processes the information signal to add the first link identification; and
   a second component that processes the information signal to add the second link identification;

wherein said information signal is sent along said first link from said first connector through the first component to the second device; and wherein said information signal is sent along said second link from said second connector through the second component to the second device.

11. The apparatus of claim 10, wherein:

said blade server is provided with a front panel adapted to present a display, wherein the display is selectively oriented with respect to a user after said orientation of said blade server has been determined.

12. The apparatus of claim 10, wherein:

the edge of said blade server that is in corresponding relationship with the connector receiving said information signal is adjacent to a side of said slot that is indicated by an information signal element.

13. In association with an electronic components support member that has opposing first and second edges, and is insertable into chassis of different types for use therewith, a method comprising the steps of:

providing a single connector located in a given chassis that engages a first connector when the electronic components support member is in a first orientation to exchange signals with a second device along a first link and that engages a second connector when the electronic components support member is in a second orientation to exchange signals with said second device along a second link;

inserting said electronic components support member into the given chassis to bring either the first connector or the second connector into engagement with the single connector depending on an orientation of said electronic components support member with respect to said given chassis, wherein said first and second connectors are located in pre-specified corresponding relationship with said first and second edges of said electronic components support member, respectively;

generating an information signal in said given chassis;

responsive to engaging the single connector located in said given chassis to said first connector when the electronic components support member is in the first orientation, exchanging signals with the second device along the first link wherein when said first connector engages said single connector, said second connector remains open and disconnected and disengaged from all other connectors;

responsive to engaging the single connector only to said second connector when the electronic components support member is in the second orientation, exchanging signals with said second device along said second link wherein when said second connector engages said single connector, said first connector remains open and disconnected and disengaged from all other connectors;

sending said information signal from a chassis connector to said second device;

determining, by the second device, whether the electronic components support structure is in the first orientation by a first link identification or determining by the second device whether the electronic components support structure is in the second link by a second link identification;

providing a first component that processes the information signal to add the first link identification;

providing a second component that processes the information signal to add the second link identification;

responsive to the single connector engaging the first connector, sending said information signal on said first link from said first connector through the first component to the second device; and responsive to the single connector engaging the second connector, sending said information signal on said second link from said second connector through the second component to the second device.

14. The method of claim 13, wherein:

a display provided in a front panel of said support member has a pre-specified upright mode, and is oriented to said upright mode regardless of whether said support member is in the first orientation or in the second orientation with respect to said given chassis.

* * * * *